US009071535B2

(12) United States Patent
Chattopadhyay et al.

(10) Patent No.: US 9,071,535 B2
(45) Date of Patent: Jun. 30, 2015

(54) COMPARING NODE STATES TO DETECT ANOMALIES

(71) Applicant: MICROSOFT CORPORATION, Redmond, WA (US)

(72) Inventors: Somak Chattopadhyay, Redmond, WA (US); Dong Wei, Newcastle, WA (US); Suman Nath, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 270 days.

(21) Appl. No.: 13/733,288

(22) Filed: Jan. 3, 2013

(65) Prior Publication Data

US 2014/0189086 A1 Jul. 3, 2014

(51) Int. Cl.
*G06F 15/16* (2006.01)
*H04L 12/24* (2006.01)

(52) U.S. Cl.
CPC ........... *H04L 41/145* (2013.01); *H04L 41/0677* (2013.01); *H04L 41/0873* (2013.01); *H04L 41/0886* (2013.01); *H04L 41/0654* (2013.01); *H04L 41/065* (2013.01); *H04L 41/5096* (2013.01)

(58) Field of Classification Search
CPC . H04L 41/147; H04L 41/5096; H04L 41/065; H04L 41/0873; H04L 45/02; H04L 41/0886; H04L 41/0677; H04L 41/0654
USPC .......... 709/200–203, 217–227, 228; 370/252, 370/253
See application file for complete search history.

(56) References Cited

U.S. PATENT DOCUMENTS

| 6,704,874 | B1 | 3/2004 | Porras et al. |
| 7,017,186 | B2 | 3/2006 | Day |
| 7,363,656 | B2 | 4/2008 | Weber et al. |
| 7,509,677 | B2 | 3/2009 | Saurabh et al. |
| 7,818,408 | B1 * | 10/2010 | Ignatuk et al. ............... 709/221 |

(Continued)

OTHER PUBLICATIONS

Thangavel, et al., "Cluster based Statistical Anomaly Intrusion Detection for Varied Attack Intensities", In International Journal of Computer Applications, vol. 24, Issue 9, Jun. 2011, 7 pages.

(Continued)

*Primary Examiner* — Moustafa M Meky
(74) *Attorney, Agent, or Firm* — Ben Tabor; Kate Drakos; Micky Minhas

(57) ABSTRACT

Methods, systems, and computer storage media for detecting anomalies within nodes of a data center are provided. A self-learning system is employed to proactively and automatically detect the anomalies using one or more locally hosted agents for pulling information that describes states of a plurality of nodes (e.g., computing devices of a cloud-computing infrastructure), respectively, and using at least one early-warning mechanism for implementing a comparison technique. The comparison technique involves individually comparing the state information of the plurality of the nodes against one another and, based upon the comparison, grouping one or more nodes of the plurality of nodes into clusters that exhibit substantially similar state information. Upon identifying the clusters that include low number of nodes grouped therein, with respect to a remainder of the clusters of nodes, the members of the identified clusters are designated as anomalous machines.

20 Claims, 6 Drawing Sheets

(56) References Cited

U.S. PATENT DOCUMENTS

| | | | |
|---|---|---|---|
| 8,028,193 B2* | 9/2011 | Dake et al. ............... | 714/13 |
| 8,108,930 B2 | 1/2012 | Hoefelmeyer et al. | |
| 8,613,085 B2* | 12/2013 | Diab et al. ............... | 726/22 |
| 8,712,017 B2* | 4/2014 | Ala-Rami et al. ......... | 379/14.01 |
| 2009/0158081 A1* | 6/2009 | Dake et al. ............... | 714/3 |
| 2012/0275574 A1* | 11/2012 | Ala-Rami et al. ......... | 379/32.01 |

OTHER PUBLICATIONS

"Cisco Intrusion Prevention System Solutions", Published on: Feb. 4, 2009, Available at: http://www.cisco.com/en/US/prod/collateral/vpndevc/ps5729/ps5713/ps4077/product_data_sheet0900aecd805baef2_ps6120_Products_Data_Sheet.html.

Patcha, et al., "An Overview of Anomaly Detection Techniques: Existing Solutions and Latest Technological Trends", In Proceedings of Computer Networks, Oct. 11, 2012, 25 pages.

\* cited by examiner

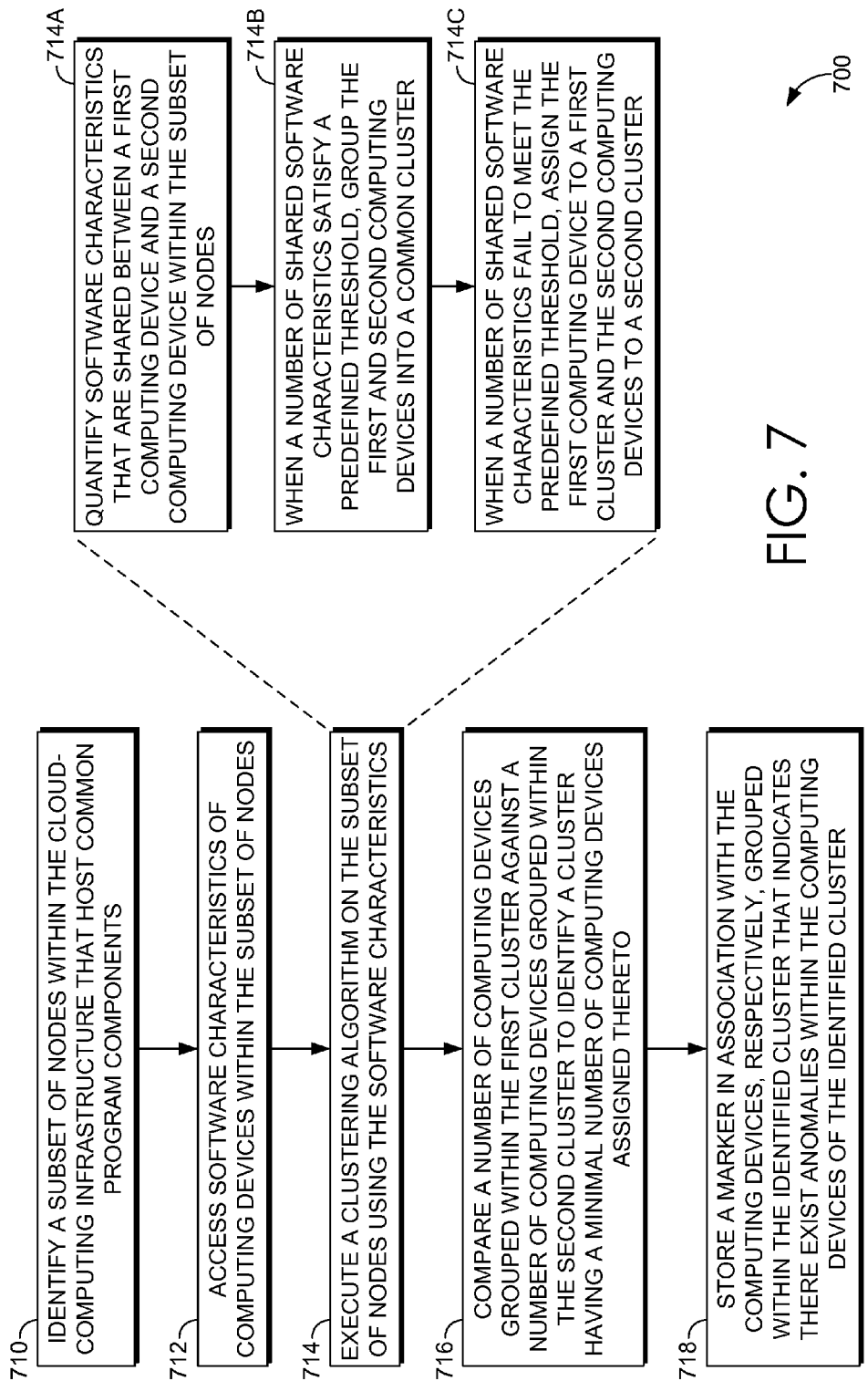

COMPARING NODE STATES TO DETECT ANOMALIES

BACKGROUND

Large-scale networked systems are commonplace systems employed in a variety of settings for running service applications and maintaining data for business and operational functions. For instance, a data center within a networked system may support operation of a variety of differing service applications (e.g., web applications, email services, search engine services, etc.). These networked systems typically include a large number of nodes distributed throughout one or more data centers, in which each node resembles a physical machine or a virtual machine running on a physical host. Due partly to the large number of the nodes that may be included within such large-scale systems, detecting anomalies within the various nodes can be a time-consuming and costly process.

Similar to other articles of software, these networked systems are susceptible to software failures, misconfigurations, or bugs affecting the software installed on the nodes of the data centers. Therefore, it is necessary to inspect the software and/or hardware to fix errors (e.g., security vulnerabilities) within the nodes. Generally, undetected software and/or hardware errors, or anomalies, within the nodes will adversely affect security and/or functionality offered to component programs (e.g., tenants) of a customer's service application residing on the nodes.

At the present time, data-center administrators are limited to an individualized process that employs manual efforts directed toward reviewing software individually on each node in a piecemeal fashion. Typically, the administrators of the data center experience interruption and unavailability of the service applications running on top of the nodes comprising the data center prior to conducting their review of the faulty nodes. One reason why it is difficult for the administrators to detect potentially mis-configured or compromised resources within nodes of the networked system is that there exist thousands of nodes which may be mis-configured or unsecure (e.g., subject to outside intrusions).

Another reason why it is difficult for the administrators to detect potentially mis-configured or compromised resources within nodes of the networked system is that the networked system represents a dynamic platform that is constantly evolving as it operates. For example, there may be large number of nodes running various combinations of component programs. As such, the configuration of these nodes varies for each component-program combination. Further, the configurations are progressively updated as new services and/or features are added to the component programs.

A conventional technique for detecting misconfigurations employs a hard-coded process lists corresponding with each of the nodes. This conventional technique provides alerts when there appears to be rogue processes outside the hard-coded process lists that are discovered as starting up or currently running on the nodes. However, the maintenance cost for supporting this conventional technique is extremely high, as the conventional technique requires the latest configuration updates applies to all of the nodes and component programs every time a new process is added to the process lists of any particular node. This high maintenance cost is exaggerated when implementing the conventional technique within a cloud-computing infrastructure, where new processes are launched frequently based upon load and other factors.

Additionally, the conventional techniques that attempt to detect misconfigurations are reactionary in nature. In this way, the conventional techniques are typically invoked only upon a customer detecting an issue and reporting it to a hosting service. At that point, an administrator within the hosting service would be tasked with manually diagnosing the issue and ascertaining a solution.

Accordingly, the conventional techniques rely on the data-center administrators to manually perform the inspections individually, as ad hoc solutions, which are labor-intensive, and are error-prone. Further, these conventional techniques do not guarantee a reliable result that is consistent across the data center. These shortcomings of individualized inspections are exaggerated when the data center is expansive in size, comprising a multitude of interconnected hardware components (e.g., nodes), that support the operation of a multitude of service applications.

As such, providing a reliable self-learning system that proactively and automatically detects anomalies within nodes of a distributed cloud-computing infrastructure would mitigate the problematic results of the piecemeal misconfiguration inspections currently in place. Further, the self-learning system, as described by embodiments of the present invention, would be able to detect anomalies before functionality of the nodes and/or the service applications is adversely affected, thereby preventing internal failures and exploitation by external threats.

SUMMARY

This Summary is provided to introduce concepts in a simplified form that are further described below in the Detailed Description. This Summary is not intended to identify key features or essential features of the claimed subject matter, nor is it intended to be used as an aid in determining the scope of the claimed subject matter.

Embodiments of the present invention introduce computer systems, computerized methods, and computer-readable media for providing a reliable self-learning system that proactively and automatically detects anomalies within nodes of a distributed cloud-computing infrastructure. This proactive and automatic detection helps mitigate the problematic results of the piecemeal misconfiguration inspections currently in place using conventional techniques. Further, the self-learning system, as described by embodiments of the present invention, is able to detect anomalies before functionality of the nodes and/or the service applications is adversely affected by the anomalies, thereby stemming any internal failures or exploitation by external threats that may occur as a result of the anomalies. Thus, the issues caused by anomalies, which result in customer dissatisfaction, are preempted by the self-learning system.

Initially, as used herein, "nodes" represent physical hosts (e.g., computing devices) capable of running tenants of a customer's service application within the cloud-computing infrastructure, a data center, a distributed computing platform, or any other networked system. As used herein, the term "tenants" broadly refers to instances of one or more roles of a service application. These "instances" typically represent copies or replications of at least one role, which resembles a component program, for supporting particular functional aspects of the service application.

In an exemplary embodiment, the self-learning system operates without requiring prior knowledge of the exact configuration of a particular role (i.e., does not rely on process lists of nodes or component programs). Further, the self-learning system does not need to be updated with data describing configuration modifications resulting from changes to nodes or component programs. Instead, the self-learning system leverages unique characteristics of the cloud-computing infrastructure (e.g., large number of substantially similar role instances) to cluster nodes and to sort out bad actors. For example, sorting out bad actors may involve detecting misconfigurations within firewall rules or recognizing rogue processes running on nodes of the cloud-computing infrastructure.

In an exemplary embodiment, the self-learning system employs an comparison technique (e.g., pattern-recognition technologies) to identify vulnerable or compromised resources within a cloud-computing infrastructure. Initially, the self-learning system may include agent(s) residing locally on nodes and at least one early-warning mechanism that is centrally located within the cloud-computing infrastructure. The agents are tasked with collecting a vast amount state information (e.g., configuration and/or runtime data) from the nodes established within data centers of the cloud-computing infrastructure. This state information is delivered to and consumed by the early-warning mechanism. Using the state information, the early-warning mechanism executes the comparison technique that clusters the nodes based, in part, on similarity of configuration of resources thereon. The clusters are then evaluated to identify nodes (e.g., anomalous machines) that may exhibit potential mis-configurations, nefarious intrusion(s), and/or security breaches.

Generally, the comparison technique begins with nodes within the data centers that are running similarly designed instances of roles, or component programs of a service application. The assumption is that these machines should have substantially similar (if not exactly the same) configurations. If a small group of nodes stand out from the rest of the set of nodes that host a particular role instance, the comparison technique will consider this discrepancy as resulting from some fashion of anomaly. Anomalies may stem from intentional attacks as well as unintentional mis-repairs to the nodes. For example, mis-repairs may include resource(s) on a node that are left vulnerable because a custodian of the data center manually changed the configuration of the node during an investigation and forgot to revert the node to runtime settings or did not update the node to the most recent software correctly.

In embodiments, the self-learning system may be programmed to apply this comparison technique in multiple areas of detection. In one instance, the comparison technique may applied to detect firewall mis-configurations. In another instance, the comparison technique may applied to detect intrusion by checking the running processes. Accordingly, the comparison technique implemented by embodiments of the present invention is employed to detect various types of anomalies without first receiving a notification of a failure or security breach.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates substantially similar or identical items.

FIG. 7 is a flow diagram showing an overall method for discovering anomalies within nodes of the cloud-computing infrastructure based on the comparison technique, in accordance with an embodiment of the present invention.

DETAILED DESCRIPTION

Figure 1:
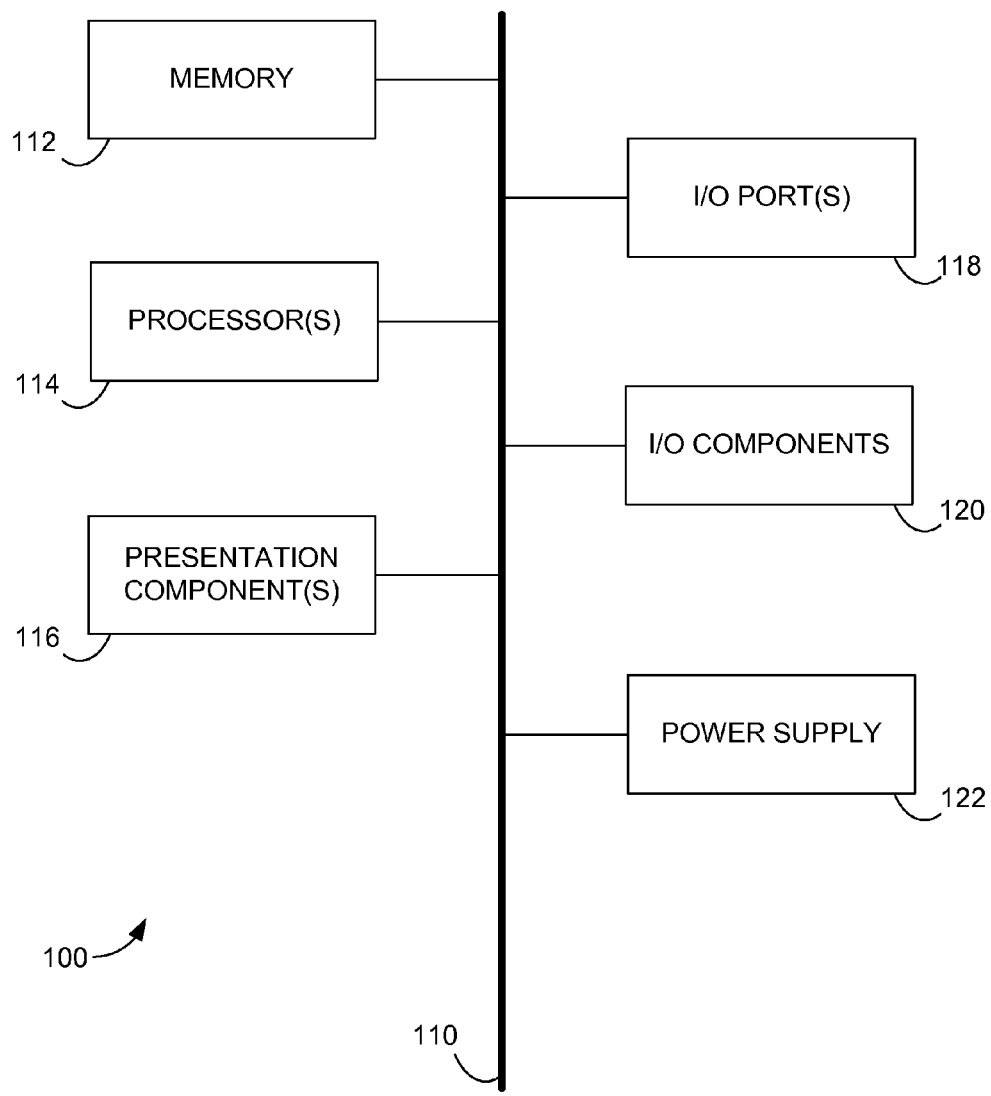
FIG. 1 is a block diagram of an exemplary computing environment suitable for use in implementing embodiments of the present invention.

The subject matter of embodiments of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies.

Overview of Embodiments of the Invention

Embodiments of the present invention relate to methods, systems, and computer-storage media having computer-executable instructions embodied thereon that, when executed, perform methods in accordance with embodiments hereof, for detecting anomalies within nodes of a cloud-computing infrastructure. The nodes generally represents servers (e.g., computing devices) within the context of a distributed computing environment that support operations of service applications running on top of the servers in a distributed fashion. These nodes may be geographically contained within data centers that, when interacting together, comprise the topology of the cloud-computing infrastructure.

Enforcing robust security measures and ensuring minimal failures with the data center help maintain a viable cloud-computing infrastructure. Thus, embodiments of the present invention advance securing and providing reliability to nodes of the cloud-computing infrastructure. In particular, embodiments of the present invention introduce a self-learning system that proactively and automatically detects anomalous machines within the nodes using a comparison technique, which is discussed more fully below. Once detected, the anomalous machines (e.g., hosting mis-configured resources) are ranked and reported. In one instance, the self-leaning system automatically calculates a degree of risk for each anomalous machine and uses the degree of risk for generating alerts. The alerts may include automatically prepared summary reports (e.g., including human-readable descriptions of the anomalies) to describe characteristics of anomalous machines. As will be made evident in the discussion below, the self-learning system may be applied to a variety of service-application scenarios, such as detecting firewall misconfigurations and software misconfigurations within a distributed system.

Accordingly, in one aspect, embodiments of the present invention relate to one or more computer storage media that has computer-executable instructions embodied thereon that, when executed, perform a method for detecting and alerting of anomalies within a cloud-computing infrastructure. Initially, the method involves pulling information that describes a state of a plurality of computing devices, respectively, using agents of a self-learning system. Typically, the plurality of computing devices represent nodes within the cloud-computing infrastructure. In embodiments, the state information represents any data that characterizes software or hardware that may be associated with nodes, such as firewall rules and/or indicia of software components installed on the computing devices, respectively.

A early-warning mechanism of the self-learning system is employed to individually compare the state information of the plurality of computing devices against one another. Based upon the comparison, one or more computer devices of the plurality of computing devices are grouped into clusters of nodes that exhibit substantially similar state information. The method further involves identifying clusters of nodes that include low number of computer devices grouped therein with respect to a remainder of the clusters of nodes. These computing devices within the identified clusters of nodes are designed as anomalous machines and communication is initiated that notifies an administrator of the cloud-computing infrastructure of the anomalous machines.

In another aspect, embodiments of the present invention relate to a computerized method for discovering anomalies within nodes of a cloud-computing infrastructure based on a comparison technique. Initially, the method involves identifying a subset of nodes within the cloud-computing infrastructure that host common program components. Software characteristics of computing devices within the subset of nodes may be accessed using agents of the self-learning system. At least one early-warning mechanism of the self-learning system may execute a clustering algorithm on the subset of nodes using the software characteristics.

In an exemplary embodiment of the present invention, executing the clustering algorithm comprises quantifying software characteristics that are shared between a first computing device and a second computing device within the subset of nodes. In instances, quantifying software characteristics that are shared between the first and second computing devices includes executing a similarity function that uses as inputs a state of the first computing device and a state of the second computing device. When a number of shared software characteristics satisfy a predefined threshold, the clustering algorithm involves grouping the first and second computing devices into a common cluster. When a number of shared software characteristics fail to meet the predefined threshold, the clustering algorithm involves assigning the first computing device to a first cluster and the second computing devices to a second cluster.

The method implemented by the early-warning mechanism may further comprise comparing a number of computing devices grouped within the first cluster against a number of computing devices grouped within the second cluster. This comparison helps to identify a cluster having a minimal number of computing devices assigned thereto. A marker is stored in association with the computing devices, respectively, grouped within the identified cluster. Accordingly, the marker indicates there exist anomalies within the computing devices of the identified cluster.

In other embodiments, the method involves computing a difference between the software characteristics of the first computing device and the software characteristics of the second computing device. Upon computing a difference between the software characteristics of the first and second computing devices, a report may be generated that articulates components that are shared and/or not shared by the first and second computing devices. This report may be used by an administrator of the cloud-computing infrastructure to fix any misconfigurations or cure any anomalies residing on the first and/or second computing devices.

In a third aspect, an exemplary computer system, or "self-learning system," is provided for performing a method that extracts information from nodes to identify anomalies prior to the anomalies affecting functionality of a service application running on the nodes. In embodiments, the computer system includes a processing unit coupled to a computer storage medium that stores a plurality of computer software components executable by the processing unit. Initially, the computer software components include one or more agents and an early-warning mechanism. The agents may comprise a first agent residing on a first node within a set of nodes and a second agent residing on a second node within the set of nodes. In operation, the first agent is configured to monitor a state of the first node, while the second agent is configured to monitor a state of the second node. Typically, the set of nodes represent computing devices capable of distributively hosting tenants the service application within a cloud-computing infrastructure.

The early-warning mechanism is configured to receive information describing the state of the first node from the first agent and to receive information describing the state of the second node from the second agent. In embodiments, the early-warning mechanism is further configured to compare the state information of the first node against the state information of the second node. Upon performing the comparison, the first and second nodes may be grouped into a single cluster when the state information (e.g., firewall rules or indicia of software components installed on the nodes) of the first and second nodes is comparable. Otherwise, the first and second nodes are assigned to separate clusters, respectively, when the state information of the first and second nodes is dissimilar. When there exists more than one cluster, one of the clusters may be targeted as including a fewest number of nodes grouped therein with respect to a remainder of the clusters. This targeted cluster is typically designated as including anomalous machines. Upon detecting anomalous machines, the early-warning mechanism is further configured for initiating a communication that notifies an administrator of the cloud-computing infrastructure of the anomalous machines.

Embodiments, of the present invention relate to detecting anomalies within resources or component programs accommodated by nodes that are distributed throughout a distributed computing environment, or data center(s). In one instance, the nodes represent computing devices capable of running role instances (i.e., tenants) of the service application within a distributed computing platform. As used herein, the term "roles" or role instances is not meant to be limiting, but may include any replication of at least one role, which generally resembles a component program that supports particular functional aspects of a service application.

As such, "roles" provide a template description of a functional portion of the service application. Roles are described by indicating the computer code implementing the role, the conditions within the hosting environment that are required by the role, configuration settings to be applied to the role, and the role's set of endpoints for communication with other roles, elements, etc. In one instance, the role's configuration settings may include collective settings which are shared by all instances of the role, or individual settings that are particular to each instance of the role. In an exemplary embodiment, the roles each represent a particular class of component of the service application. Typically, the service model delineates how many instances of each of the one or more roles to place within the data center, where each of the instances is a replication of the particular class of component, or role. In other words, each role represents a collection of instances of each class of components, where the service application may have any number of classes of components for carrying out functions thereof.

Multiple and varied implementations and embodiments are described below. Having briefly described an overview of embodiments of the present invention, the following section describes an operating environment suitable for implementing embodiments of the present invention. The following sections describe illustrative aspects of the techniques for carrying out embodiments of the present invention.

Exemplary Operating Environment

Referring to the drawings in general, and initially to FIG. 1 in particular, an exemplary operating environment for implementing the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components/modules illustrated.

The invention may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The invention may be practiced in a variety of system configurations, including hand-held devices, consumer electronics, general-purpose computers, specialty computing devices, etc. The invention may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and nonremovable media. By way of example, and not limitation, computer-readable media may comprise computer storage media and communication media.

Computer storage media includes volatile and non-volatile, removable and non-removable media implemented in any method or technology for storage of information such as computer readable instructions, data structures, program modules, or other data. Computer storage media include, but are not limited to, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device.

In contrast, communication media typically embody computer-readable instructions, data structures, program modules, or other data in a modulated data signal, such as a carrier wave or other transport mechanism and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above should also be included within the scope of computer-readable media; however, as defined herein, computer storage media does not include communication media.

Memory 112 includes computer-storage media in the form of volatile and/or nonvolatile memory. The memory may be removable, nonremovable, or a combination thereof. Exemplary hardware devices include solid-state memory, hard drives, optical-disk drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

Ports 118 allow computing device 100 to be logically coupled to other devices including I/O components 120, some of which may be built in. Illustrative components include a microphone, joystick, game pad, satellite dish, scanner, printer, wireless device, etc.

Architecture of Exemplary Cloud-Computing Infrastructures

Figure 2:
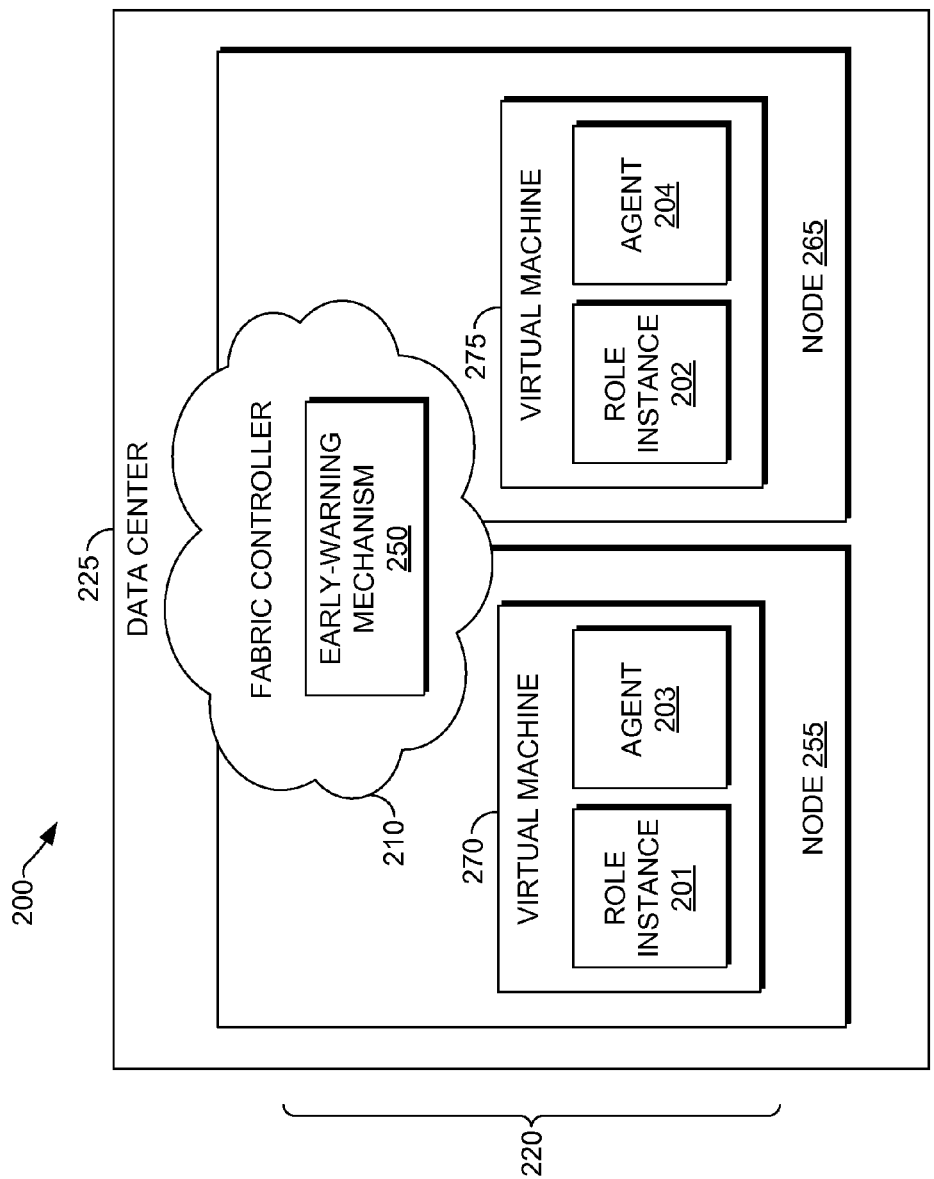
FIG. 2 is a block diagram illustrating an architecture of an exemplary cloud-computing infrastructure, suitable for use in implementing embodiments of the present invention, that is configured to detect anomalies within a set of nodes using a comparison technique.

With reference to FIGS. 1 and 2, a first node 255 and/or second node 265 may be implemented by the exemplary computing device 100 of FIG. 1. Further, role instance 201 and/or role instance 202 may be provided with access to portions of the memory 112 of FIG. 1 and/or allocated an amount of processing capacity available at the processors 114 of FIG. 1 for conducting operations that support their respective service applications.

Turning now to FIG. 2, a block diagram illustrating an architecture 200 of an exemplary cloud-computing infrastructure, suitable for use in implementing embodiments of the present invention, is shown. The cloud-computing infrastructure includes a self-learning system 220 that is configured to detect anomalies within a set of nodes using a comparison technique. In an exemplary embodiment, the self-learning system 220 is provided for performing a method that extracts information from nodes to identify anomalies prior to the anomalies affecting functionality of a service application running on the nodes.

The distributed computing environment of FIG. 2 includes a data center 225 configured to accommodate and support operation of component programs, or instances of roles, of a particular service application according to the fabric controller 210. It will be understood and appreciated that the data center 225 shown in FIG. 2 is merely an example of one suitable for accommodating one or more service applications and is not intended to suggest any limitation as to the scope of use or functionality of embodiments of the present invention. Neither should the data center 225 be interpreted as having any dependency or requirement related to any single resource, combination of resources, combination of nodes (e.g., nodes 255 and 265), or set of APIs to access the resources and/or nodes.

Further, it will be understood and appreciated that the architecture 200 of the cloud-computing infrastructure shown in FIG. 2 is merely an example of one suitable computing system environment and is not intended to suggest any limitation as to the scope of use or functionality of embodiments of the present invention. For instance, the cloud-computing infrastructure may be a public cloud, a private cloud, or a dedicated cloud. Neither should the cloud-computing infrastructure be interpreted as having any dependency or requirement related to any single component or combination of components illustrated therein. Further, although the various blocks of FIG. 2 are shown with lines for the sake of clarity, in reality, delineating various components is not so clear, and metaphorically, the lines would more accurately be grey and fuzzy. In addition, any number of nodes, virtual machines, data centers, role instances, or combinations thereof may be employed to achieve the desired functionality within the scope of embodiments of the present invention.

The architecture 200 of the cloud-computing infrastructure includes the data center 225 configured to host and support operation of role instances 201 and 202 of a particular service application. The phrase "service application," as used herein, broadly refers to any software, or portions of software, that runs on top of, or accesses storage locations within, the data center 225. In one embodiment, one or more of the role instances 201 and 202 may represent the portions of software, component programs, or instances of roles that participate in the service application. In another embodiment, one or more of the role instances 201 and 202 may represent stored data that is accessible to the service application. It will be understood and appreciated that the role instances 201 and 202 shown in FIG. 2 are merely an example of suitable parts to support the service application and are not intended to suggest any limitation as to the scope of use or functionality of embodiments of the present invention.

Generally, virtual machines 270 and 275 are allocated to the role instances 201 and 202 of the service application based on demands (e.g., amount of processing load) placed on the service application. As used herein, the phrase "virtual machine" is not meant to be limiting, and may refer to any software, application, operating system, or program that is executed by a processing unit to underlie the functionality of the role instances 201 and 202. Further, the virtual machines 270 and 275 may include processing capacity, storage locations, and other assets within the data center 225 to properly support the role instances 201 and 202.

In operation, the virtual machines 270 and 275 are dynamically assigned resources on the first node 255 and second node 265 of the data center 225, and endpoints (e.g., the role instances 201 and 202) are dynamically placed on the virtual machines 270 and 275 to satisfy the current processing load. In one instance, a fabric controller 210 is responsible for automatically managing the virtual machines 270 and 275 and for placing the role instances 201 and 202 and other resources (e.g., software components) within the data center 225. By way of example, the fabric controller 210 may rely on a service model (e.g., designed by a customer that owns the service application) to provide guidance on how, where, and when to configure the virtual machines 270 and 275 and how, where, and when to place the role instances 201 and 202 thereon.

As discussed above, the virtual machines 270 and 275 may be dynamically established and configured within the first node 255 and second node 265. Per embodiments of the present invention, the nodes 255 and 265 represent any form of computing devices, such as, for example, a personal computer, a desktop computer, a laptop computer, a mobile device, a consumer electronic device, server(s), the computing device 100 of FIG. 1, and the like. In one instance, the nodes 255 and 265 host and support the operations of the virtual machines 270 and 275, while simultaneously hosting other virtual machines carved out for supporting other tenants of the data center 225. Often, the role instances 201 and 202 may include endpoints of distinct service applications owned by different customers.

Typically, each of the nodes 255 and 265 include, or is linked to, some form of a computing unit (e.g., central processing unit, microprocessor, etc.) to support operations of the component(s) running thereon. As utilized herein, the phrase "computing unit" generally refers to a dedicated computing device with processing power and storage memory, which supports operating software that underlies the execution of software, applications, and computer programs thereon. In one instance, the computing unit is configured with tangible hardware elements, or machines, that are integral, or operably coupled, to the nodes 255 and 265 to enable each device to perform a variety of processes and operations. In another instance, the computing unit may encompass a processor (not shown) coupled to the computer-readable medium (e.g., computer storage media and communication media) accommodated by each of the nodes 255 and 265. Generally, the computer storage medium stores, at least temporarily, a plurality of computer software components that are executable by the processor. As utilized herein, the term "processor" is not meant to be limiting and may encompass any elements of the computing unit that act in a computational capacity. In such capacity, the processor may be configured as a tangible article that processes instructions. In an exemplary embodiment, processing may involve fetching, decoding/interpreting, executing, and writing back instructions.

The role instances 201 and 202 that reside on the nodes 255 and 265 support operation of service applications, and may be interconnected via application programming interfaces (APIs). In one instance, one or more of these interconnections may be established via a network cloud (not shown). The network cloud serves to interconnect resources, such as the role instances 201 and 202, which may be distributably placed across various physical hosts, such as nodes 255 and 265. In addition, the network cloud facilitates communication over channels connecting the role instances 201 and 202 of the service applications running in the data center 225. By way of example, the network cloud may include, without limitation, one or more local area networks (LANs) and/or wide area networks (WANs). Such networking environments are commonplace in offices, enterprise-wide computer networks, intranets, and the Internet. Accordingly, the network is not further described herein.

The self-learning system 220 may comprise a single software component or may be partitioned into a plurality of distinct software components that interact with each other to detect anomalies within the nodes 255 and 265 of the data center 225. As illustrated in FIG. 2, the self-learning system 220 is distributed into various software components that include one or more agents 203 and 204 and at least one early-warning mechanism 250. In one embodiment, the early-warning mechanism 250 may be included within or operably coupled to the fabric controller 210, running in a centralized location within the data center 225. In another embodiment, the early-warning mechanism 250 is provisioned as at least one stand-alone compute entity running in the fabric of the cloud-computing infrastructure. Generally, in operation, the agents 203 and 204 represent a portion of the self-learning system 220 that run locally on the nodes 255 and 265 and serve to gather and distribute information describing a state of the nodes 255 and 265 and/or a state of the resources (e.g., roles instances 201 and 202 or virtual machines 270 and 275) hosted on the nodes 255 and 265. Meanwhile, the early-warning mechanism 250 represents a portion of the self-learning system 220 that runs remotely from the nodes 255 and 265 and serve receive and analyze (e.g., using a comparison technique) the state information collected by the agents 203 and 204.

As used herein, the phrase "state information" is not meant to be limiting but may include any data that describes a configuration of hardware (e.g., recognizing the presence of certain equipment) of one or more machines and/or a definition of resources (e.g., software, program components, or role instances) running on those machine(s). In one instance, the state information may comprise any data information that the self-learning system 220 deems important to securing program components of the service application within a node. This data related to securing program components may include data that serves to detect firewall misconfiguration. For example, the state information may include a set of firewall rules pulled from machines within the data center 225. If a firewall misconfiguration (e.g., Internet information server (IIS) OS component installed on a node) goes undetected using conventional mechanisms, the firewall misconfiguration may be used by nefarious actors to exploit the node and compromise the software running thereon.

Accordingly, state information may be any data to detect issues, misconfigurations, or potential risks associated with the nodes 255 and 265 or resources of the data center 225. In one instance, the content of the state information may depend on a type of a particular role instance of a service application being hosted one a node. In another instance the content of the state information may depend on features of a particular type of node of the data center (i.e., pulling different data from different types of machines having different features). The type of node may be determined by aggregating a super-set of features (e.g., all available features), where the type of node is used to identify the items of state data that are to be retrieved from the node. In this way, the state information is employed to detect software misconfigurations within a node. For example, the state information may include indicia of the set of software components installed on and/or processes running on a node. In yet another instance, the state information may include data that describes characteristics of an operating system of a node and/or characteristics of software running on the operating system.

With continued reference to FIG. 2, the agent portions of the self-learning system 220 may comprise a first agent 203 residing on a first node 255 within a set of nodes in the data center 225 a second agent 204 residing on a second node 265 within the set of nodes. In operation, the first agent 203 is configured to monitor a state of the first node 255, while the second agent 204 is configured to monitor a state of the second node 265. Typically, as mentioned above, the set of nodes represent computing devices capable of distributively hosting tenants the service application within a cloud-computing infrastructure.

The early-warning mechanism 250 is configured to receive information describing the state of the first node 255 from the first agent 203 and to receive information describing the state of the second node 265 from the second agent 204. In embodiments, the early-warning mechanism 250 is further configured to compare the state information of the first node 255 against the state information of the second node 265. Upon performing the comparison, the first and second nodes 255 and 265 may be grouped into a single cluster when the state information (e.g., firewall rules or indicia of software components installed on the nodes) of the first and second nodes 255 and 265 is comparable. Otherwise, the first and second nodes 255 and 265 are assigned to separate clusters, respectively, when the state information of the first and second nodes 255 and 265 is dissimilar.

When there exists more than one cluster, one of the clusters may be targeted as including a fewest number of nodes grouped therein with respect to a remainder of the clusters. This targeted cluster is typically designated as including anomalous machines. Upon detecting anomalous machines, the early-warning mechanism 250 is further configured for initiating a communication that notifies an administrator of the cloud-computing infrastructure of the anomalous machines.

Framework of the Comparison Technique

Figure 3:
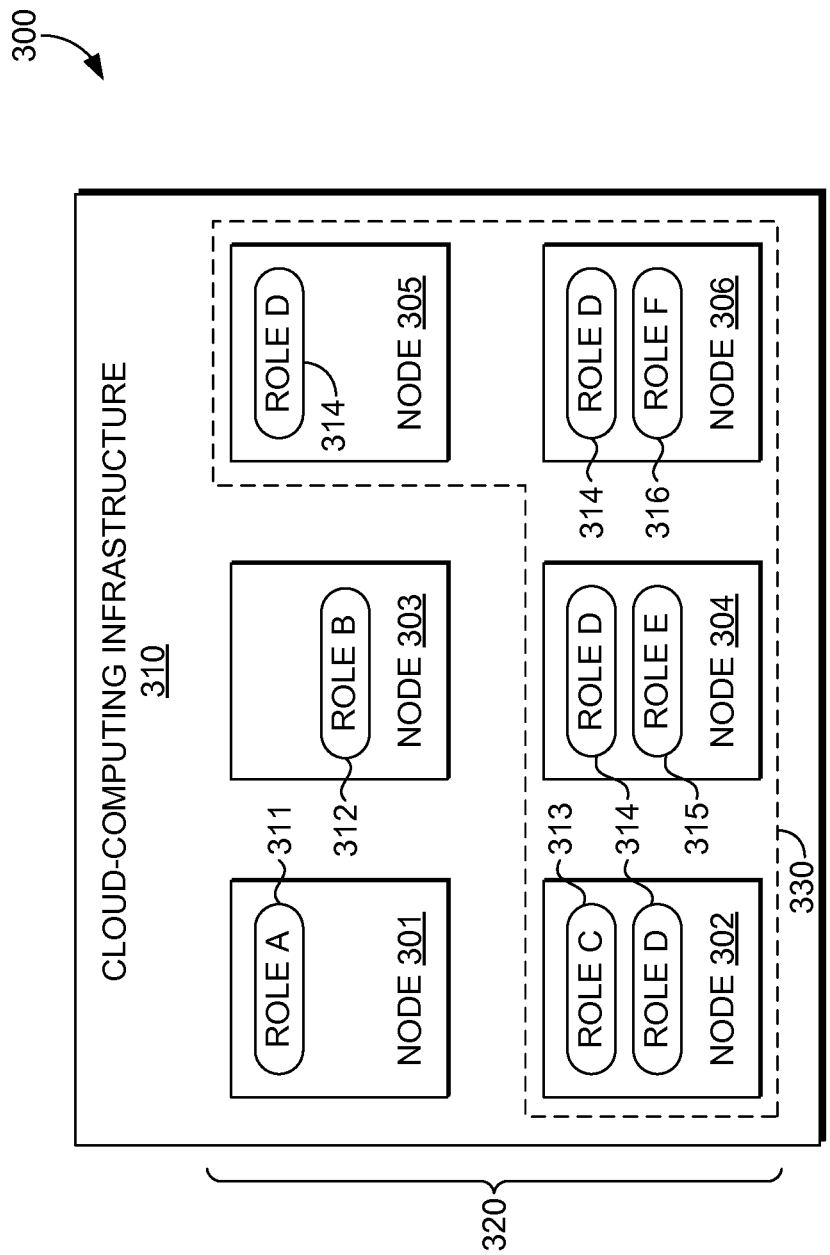
FIG. 3 is a block diagram illustrating an architecture of an exemplary cloud-computing infrastructure, suitable for use in implementing embodiments of the present invention, that is configured to organize the set of nodes using the comparison technique.

Turning now to FIG. 3, a block diagram illustrating an architecture 300 of an exemplary cloud-computing infrastructure 310, suitable for use in implementing embodiments of the present invention, is shown. The cloud-computing infrastructure 310 includes the self-learning system (not shown) that is configured to organize the set of nodes 320 using a comparison technique. The comparison technique is generally designed to determine the similarities of the nodes 320 and the differences between the nodes 320 using the state information. Further the comparison technique is generally designed to group the nodes into clusters based on, in part, how similar one or more of the nodes 320 are to one another.

In an exemplary embodiment, the comparison technique is implemented by the early-warning mechanism (described above) to determine similarities between the nodes using a function Sim(S1, S2) that, given two states S1 and S2 of two of the nodes 320, determines how similar the two nodes are. Generally the function Sim(S1, S2) is application dependent. That is, the similarity between the two nodes in questions is affected by resources and/or software components (e.g., role instances) presently running thereon.

In operation, the function Sim(S1, S2) is executed to compute the commonalities between a first node (e.g., node 301) and a second node (e.g. node 302) using the state information retrieved from the nodes. That is, function Sim(S1, S2) individually compares the nodes of the set of nodes 320 against one another. In one embodiment, the differences in role instances (e.g., role A 311 and role B 312) being hosted on the nodes (e.g., node 301 and node 303) may be captured when comparing nodes using the function Sim(S1, S2). Typically, those nodes hosting different role instances will have distinct resources installed to support the different role instances, thus, resulting in low commonality between the states of the nodes. On the other hand, the commonalities in role instances (e.g., role D 314) being hosted on the nodes (e.g., nodes 302, 304, 305, and 306) may be captured when comparing nodes using the function Sim(S1, S2). Typically, those nodes hosting similar role instances will have common resources installed to support the similar role instances, thus, resulting in high commonality between the states of the nodes. Those nodes 302, 304, 305, and 306 that have common resources (e.g., role D 314) installed thereon may be grouped into a common cluster 330.

In embodiments, the function Sim(S1, S2) returns a value 0 (minimum value) when S1 and S2 are completely different, or a value of 1 (maximum value) when S1 and S2 are equivalent. The values in between 0 and 1 indicate a level of similarity between the state S1 and S2 gleaned from the nodes that are subject of the comparison technique. In one specific implementation of firewall misconfiguration detection, the function Sim(S1, S2) may be defined as the Jackard similarity of S1 and S2 (e.g., |S1∩S2|/|S1∪S2|), where the size of intersection between S1 and S2 is divided by the size of the union between S1 and S2. It should be noted that, for other applications, the function Sim(S1, S2) may be defined in other ways. Accordingly, the function Sim(S1, S2) may be used to proactively group the nodes 320 of a cloud-computing infrastructure 310 based on the role instances being hosted thereon.

In another embodiment, the nodes 320 of the cloud-computing infrastructure 310 may be pre-grouped into subsets before executing the function Sim(S1, S2). The pre-grouping limits the number of nodes within the set of nodes 320 being compared using the function Sim(S1, S2), as opposed to blindly making comparisons between all the nodes 320 in a data center. In other words, a subset of nodes (e.g., nodes 302, 304, 305, and 306) is identified within the cloud-computing infrastructure 310 that host common program components (e.g., role D 314) prior to accessing software characteristics of computing devices within the subset of nodes and/or executing a clustering algorithm (e.g., function Sim(S1, S2)) on the subset of nodes using the software characteristics.

The comparison technique may further involve a determining a difference between the nodes 320 of FIG. 3. In one instance, determining the difference involves executing a difference function, such as function Diff(S1, S2) The function Diff(S1, S2), given two states S1 and S2 of two nodes, generates a human readable description of the difference of S1 from S2. This function Diff(S1, S2) is typically application dependent. That is, when executing the function Diff(S1, S2) on a pair of nodes, the role instances and/or resources installed on the nodes will likely affect a result of the function Diff(S1, S2).

Figure 5:
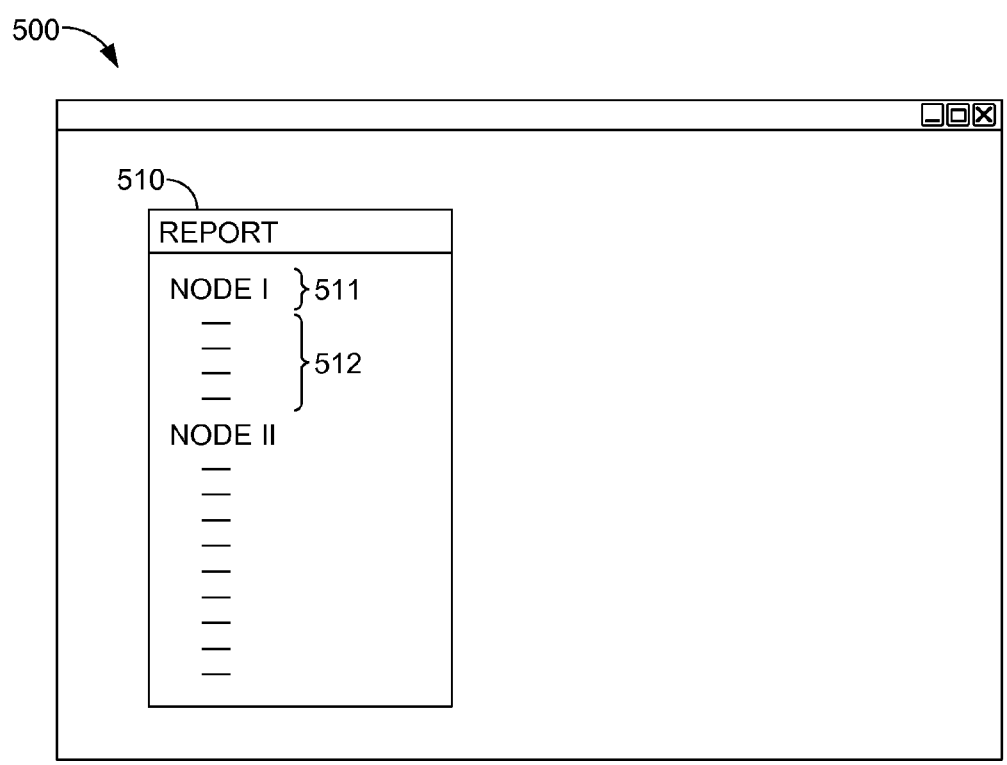
FIG. 5 is a graphical representation of an exemplary user interface (UI) for reporting anomalies to an administrator, in accordance with an embodiment of the present invention.

The result of the function Diff(S1, S2) may be used to develop a report on how S1 and S2 are different. In one instance, the report may include a spreadsheet that exposes whether the set of firewall rules that is present on S1 exists on S2. Although discussed as being a spreadsheet, the report generated from the result of the function Diff(S1, S2) may be provided in any format. For instance, with reference to the exemplary UI 500 of FIG. 5, the report 510 may list that indicates the particular components 512 that are unique to a certain node 511. In another instance, within an implementation for detecting firewall misconfiguration, the function Diff(S1, S2) describes what firewall rules are redundant or missing in a first node 301 (having state S1) compared to a second node 303 (having state S2).

It should be noted, that the functions Sim(S1, S2) and Diff(S1, S2) may represent the application-specific steps in the framework of the comparison technique.

In one example of an application-specific step, when looking into firewall misconfigurations of a data center, the function Sim(S1, S2) would be focused upon whether a set of firewall rules appear on one node but not on another node. In another example of an application-specific step, when looking into software anomalies of a data center, the function Sim(S1, S2) would be focused on whether a certain role instances of a service application were running on one node and not another node.

The remaining steps (discussed below) are generally application-independent. As used herein, the phrase "application independent" refers to a feature of a tool that is adaptable to any system without rewriting logic of the tool. In this instance, the tool is the comparison technique and the comparison technique is adaptable to any scenario for detecting similarities and differences between nodes by simply rewriting or slightly revising the logic of the similarity and difference functions (e.g., function Sim(S1, S2) and function Diff(S1, S2)) without any other changes.

Figure 4:
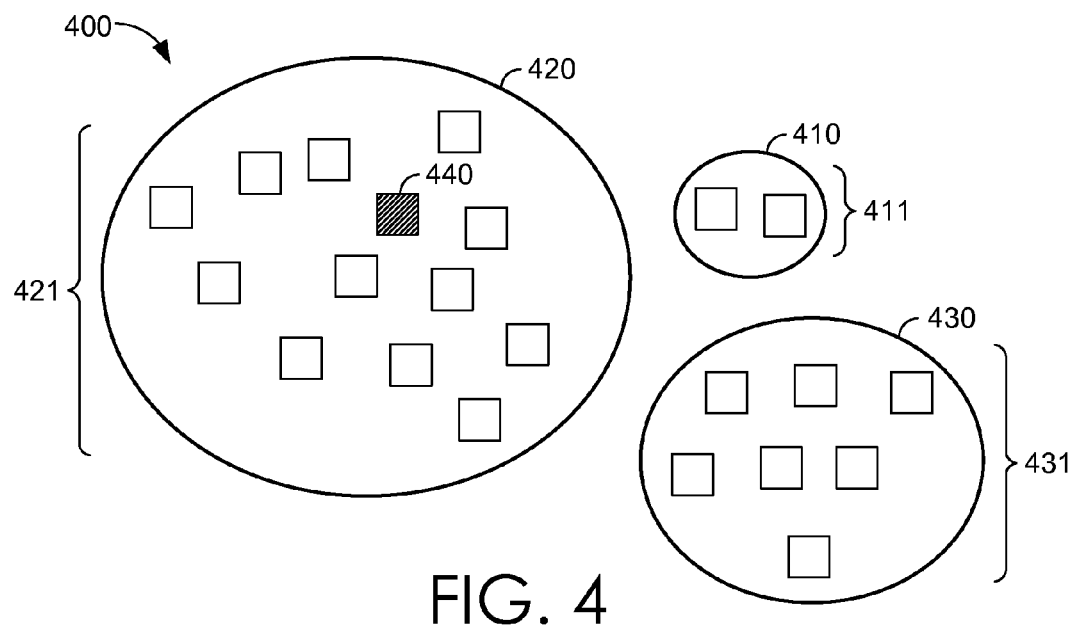
FIG. 4 is a diagrammatic view of nodes grouped into clusters, in the context of embodiments of the present invention.

Turning to FIG. 4, a diagrammatic view 400 of nodes grouped into clusters 410, 420, and 430 is shown, in the context of embodiments of the present invention. In embodiments, the grouping of nodes into clusters is carried out by a clustering-algorithm step of the comparison technique carried out by the early-warning mechanism. Generally, given nodes with states S1, S2 . . . Sn, the clustering algorithm is employed to group the nodes into clusters of similarly situated nodes. It should be noted that there are many possible clustering algorithms that may be implemented within the comparison technique. In one instance, the clustering algorithm uses as an input the value 0-1 that is output from the function Sim(S, S2). For example, a non-parametric clustering algorithm (e.g., variational mode seeking algorithm or quickshift algorithm) imports the results of the function Sim(S1, S2) that computes the commonality of two nodes (i.e., quantifying software characteristics that are shared between a first computing device and a second computing device within the subset of nodes). Based on a level of similarity of the two nodes being compared, the non-parametric clustering algorithm may determine to group the nodes in a common cluster or separate clusters.

For instance, when a number of shared software characteristics of the two nodes satisfy a predefined threshold, the two nodes are grouped into a common cluster (e.g., nodes 421 within cluster 420). On the other hand, when a number of shared software characteristics of the two nodes fail to meet the predefined threshold, the nodes are assigned to different clusters. For example, a first of the nodes being compared may be grouped with the nodes 411 that are members of the cluster 410, while the second of the nodes being compared may be grouped with the nodes 431 that are members of the cluster 430.

In other words, when the value output from the function Sim(S1, S2) between nodes within single cluster is typically high, while the value output from the function Sim(S1, S2) between nodes of differing clusters is typically low. In embodiments, as mentioned above, a threshold for determining a high or low value may be predefined. In one example, when the predefined threshold is set to a value of 0.3, a value of 0.3 or higher as computed by the function Sim(S1, S2) would group the nodes being compared into a common cluster. Upon reviewing the resultant size of the clusters 410, 420, and 430 upon carrying out the cluster algorithm, the value set to the predefined threshold may be reassessed and updated to generate expected or more manageable cluster sizes. However, it should be noted that a size of the clusters may be based on how the anomaly being targeted within the nodes of the data center is defined during deployment.

Upon completing the cluster-algorithm step of the analysis technique, the number of nodes grouped within the one cluster (e.g., cluster 420) is compared against a number of nodes grouped within the another cluster (e.g., cluster 410) to identify a cluster (e.g., cluster 410) having a minimal number of nodes (e.g., nodes 411) assigned thereto. In this way, it is possible to identify anomalous machines of the nodes in a data center by inspecting the size of the clusters generated from the clustering algorithm. It should be noted that various heuristics may be used to identify anomalous machines from the clusters 410, 420, and 430.

In one implementation, those nodes (e.g., nodes 411) within small-sized clusters (e.g., 410) are designated as anomalous machines because a small-sized cluster implicitly indicates that the grouped therein include uncommon configurations. This designation is based on the assumption that not many machines within a data center share the same misconfiguration. Accordingly, those nodes 411 with a misconfiguration are detected as outliers when they are members belonging to a small-sized cluster 410. This is based on the intuition that most of the nodes 421 and 431 within the large-sized clusters 420 and 430, respectively, are properly configured and, thus, have similar states as one another. For example, experience has shown that, out of one hundred similarly disposed nodes, only one or two will include IIS, which constitutes a rare anomaly. In embodiments, the number of nodes within a cluster is compared against a threshold to determine whether the cluster includes anomalous machines or healthy machines, where the large-sized clusters that overcome the threshold typically include healthy machines as members. Accordingly, although only one small-sized cluster 410 is shown in FIG. 4, there may be many clusters that have a number of nodes less than the threshold; thus, are designated as small-sized clusters and identified as including anomalous machines.

Once the anomalous machines are discovered within the nodes of the data center, the comparison technique involves identifying a reference machine 440. Generally, the reference machine represents a node that the anomalous machines 411 should look like when all their problems are fixed. For example, within the implementation of detecting a firewall misconfiguration, the anomalous machines 411 should look like the reference machine 440 when all their anomalous firewall rules are properly configured.

There are various heuristics that may be used to identify the reference machine 440. In one instance, identifying the reference machine 440 involves targeting a healthy machine from one of the clusters 420 of nodes 421 that is separate from the identified cluster 410 that includes the anomalous machines 411 and designating the targeted healthy machine as a reference machine 440. Targeting the healthy machine may involve finding a most similar cluster 420 (e.g., nearest cluster of healthy machines 421) to the cluster 410 of anomalous machines 411 and finding a center of the most similar cluster 420. Finding the center of the most similar cluster 420 may involve discovering the healthy machine having a least amount of derivation in state with respect to other healthy machines 421 within the same cluster 420. Discovering the least amount of derivation, in embodiments, may include designating as the reference machine 440 the node having a minimum distance of other nodes 421 of the cluster 420 based on the values output by the function Sim (S1, S2). In another embodiment, the reference machine 440 is targeted by discovering a healthy machine from the closest cluster 420 to the cluster 410 of anomalous machines 411 that has a minimum distance to anomalous machines 411 of the cluster 410 based on the values output by the function Sim (S1, S2).

At this point, the comparison technique may involve ranking the anomalous machines 411 or anomalies therein in order to raise alerts for top anomalies. In embodiments, ranking the anomalous machines 411 against one another may include comparing the state information of the anomalous machines 411 against state information of the reference machine 440 or another healthy machine 421. Based on the comparison, scores may be assigned to each of the anomalous machines 411, respectively, wherein the scores quantify a distance in state between the anomalous machines 411 and the reference machine 421. In embodiments, the scores may be weighted in accordance with a predefined weighting scheme and the anomalous machines 411 may be ranked using the weighted scores.

With respect to the weighting scheme, the score assigned to an anomaly may be weighted based on, in part, of a sum of the misconfigurations returned by function Diff(anomalous machine, reference machine). In this way, the anomalies are weighted in accordance with the impact of the misconfiguration. For example, a first anomaly of a missing in-bound or out-bound rule may be cause a functionality issue on a first anomalous node, but not a substantial security issue. This first anomaly may be granted a low weighting, thereby placing the first anomalous node low in order on the ranking.

In another example, a second anomaly of a mismatched in-bound rule that includes an expanded IP-address range may be a potential security issue on a second anomalous node. This second anomaly may be granted a medium weighting, thereby placing the second anomalous node at a mid level on the ranking. In yet another example, a third anomaly of an addition in-bound or out-bound rule, which is not present on the balance of the nodes, represents a highly suspicious security issue on a third anomalous node. This third anomaly may be granted a high weighting, thereby placing the third anomalous node high in order on the ranking. As a result, the ranking provides an administrator of a data center provides a prioritized list of anomalous machines to provide alerts for and to act upon.

Process Flows

Exemplary methods for discovering anomalies are described with reference to FIGS. 6 and 7. These exemplary methods can be described in the general context of computer executable instructions. Generally, computer executable instructions can include routines, programs, objects, components, data structures, procedures, modules, functions, and the like that perform particular functions or implement particular abstract data types. The methods can also be practiced in a distributed computing environment where functions are performed by remote processing devices that are linked through a communication network or a communication cloud. In a distributed computing environment, computer executable instructions may be located both in local and remote computer storage media, including memory storage devices.

The exemplary methods are illustrated as a collection of blocks in a logical flow graph representing a sequence of operations that can be implemented in hardware, software, firmware, or a combination thereof. The order in which the methods are described is not intended to be construed as a limitation, and any number of the described method blocks can be combined in any order to implement the methods, or alternate methods. Additionally, individual operations may be omitted from the methods without departing from the spirit and scope of the subject matter described herein. In the context of software, the blocks represent computer instructions that, when executed by one or more processors, perform the recited operations.

Figure 6:
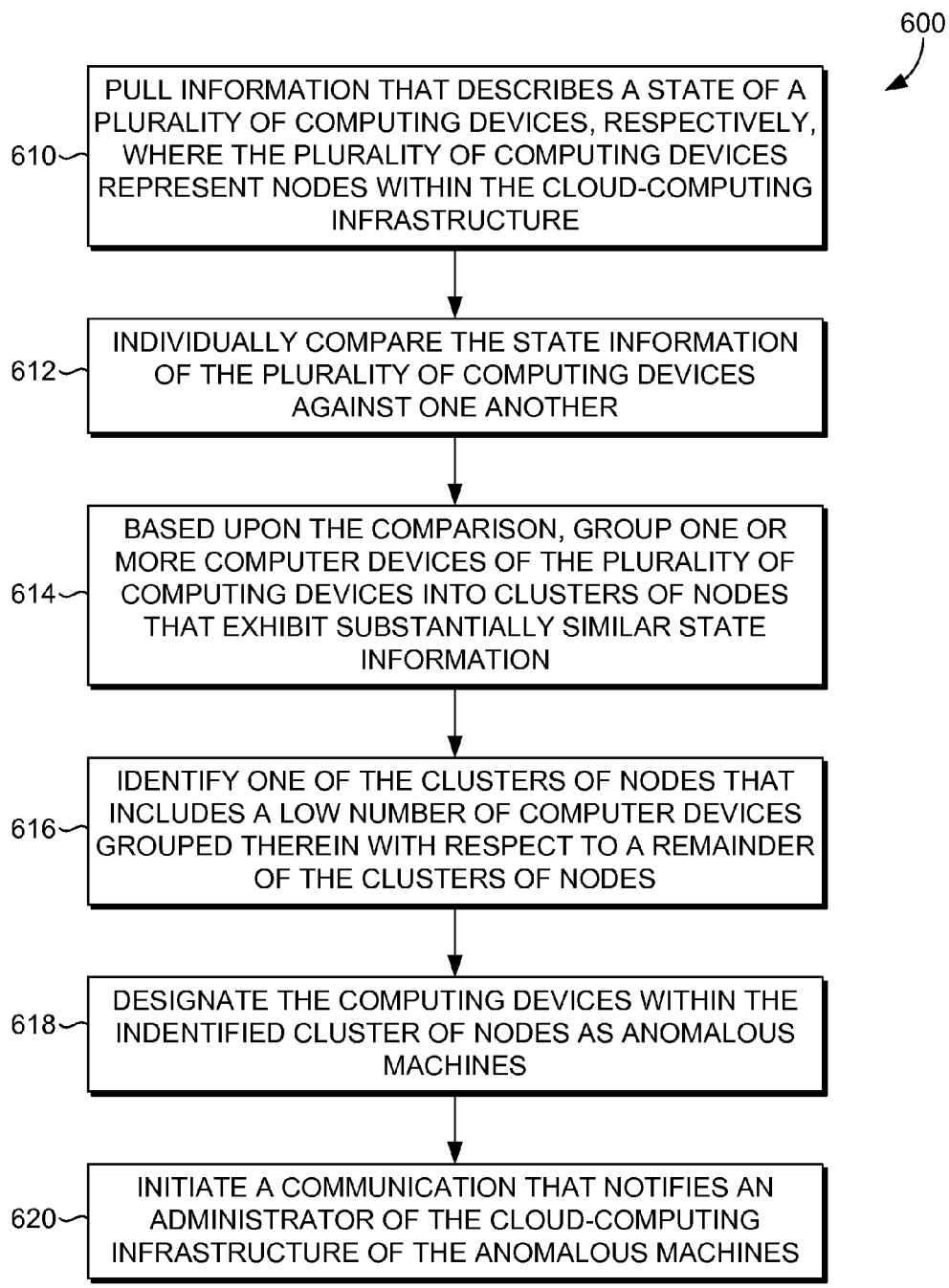
FIG. 6 is a flow diagram showing an overall method for detecting and alerting of anomalies within a cloud-computing infrastructure, in accordance with an embodiment of the present invention.

Turning to FIG. 6, a flow diagram showing an overall method 600 for detecting and alerting of anomalies within a cloud-computing infrastructure is shown, in accordance with an embodiment of the present invention. It should be noted that, although the terms "step" and/or "block" may be used herein to connote different elements of methods employed, the terms should not be interpreted as implying any particular order among or between various steps herein disclosed unless and except when the order of individual steps is explicitly described.

Initially, the method 600 involves pulling information that describes a state of a plurality of computing devices, respectively, using agents of a self-learning system, as indicated at block 610. Typically, the plurality of computing devices represent nodes within the cloud-computing infrastructure. In embodiments, the state information represents any data that characterizes software or hardware that may be associated with nodes, such as firewall rules and/or indicia of software components installed on the computing devices, respectively.

A early-warning mechanism of the self-learning system is employed to individually compare the state information of the plurality of computing devices against one another, as indicated at block 612. Based upon the comparison, one or more computer devices of the plurality of computing devices are grouped into clusters of nodes that exhibit substantially similar state information, as indicated at block 614. The method 600 further involves identifying one of the clusters of nodes that includes a low number of computer devices grouped therein with respect to a remainder of the clusters of nodes, as indicated at block 616. These computing devices within the identified cluster of nodes are designed as anomalous machines (see block 618) and communication is initiated that notifies an administrator of the cloud-computing infrastructure of the anomalous machines (see block 620).

Turning to FIG. 7, a flow diagram showing an overall method 700 for discovering anomalies within nodes of the cloud-computing infrastructure based on the comparison technique is shown, in accordance with an embodiment of the present invention. Initially, the method 700 involves identifying a subset of nodes within the cloud-computing infrastructure that host common program components, as indicated at block 710. Software characteristics of computing devices within the subset of nodes may be accessed using agents of the self-learning system, as indicated at block 712. At least one early-warning mechanism of the self-learning system may execute a clustering algorithm on the subset of nodes using the software characteristics, as indicated at block 714.

In an exemplary embodiment of the present invention, executing the clustering algorithm comprises quantifying software characteristics that are shared between a first computing device and a second computing device within the subset of nodes, as indicated at block 714A. In instances, quantifying software characteristics that are shared between the first and second computing devices includes executing a similarity function (e.g., using the function Sim(S1, S2)) that uses as inputs a state of the first computing device and a state of the second computing device. When a number of shared software characteristics satisfy a predefined threshold, the clustering algorithm involves grouping the first and second computing devices into a common cluster, as indicated at block 714B. When a number of shared software characteristics fail to meet the predefined threshold, the clustering algorithm involves assigning the first computing device to a first cluster and the second computing devices to a second cluster, as indicated at block 714C.

The method 700 implemented by the early-warning mechanism may further comprise comparing a number of computing devices grouped within the first cluster against a number of computing devices grouped within the second cluster, as indicated at block 716. This comparison helps to identify a cluster having a minimal number of computing devices assigned thereto. A marker is stored in association with the computing devices, respectively, grouped within the identified cluster, as indicated at block 718. Accordingly, the marker indicates there exist anomalies within the computing devices of the identified cluster.

In other embodiments, the method 700 involves computing a difference between the software characteristics of the first computing device and the software characteristics of the second computing device (e.g., using the function Diff(S1, S2)). Upon computing a difference between the software characteristics of the first and second computing devices, a report may be generated that articulates components that are shared and/or not shared by the first and second computing devices. This report may be used by an administrator of the cloud-computing infrastructure to fix any misconfigurations or cure any anomalies residing on the first and/or second computing devices.

Any of the acts of any of the methods described herein may be implemented at least partially by a processor or other electronic device based on instructions stored on one or more computer-readable media.

Although the invention has been described in language specific to structural features and/or methodological acts, it is to be understood that the invention is not necessarily limited to the specific features or acts described. Rather, the specific features and acts are disclosed as exemplary forms of implementing the invention. That is, embodiments of the present invention have been described in relation to particular embodiments, which are intended in all respects to be illustrative rather than restrictive. Alternative embodiments will become apparent to those of ordinary skill in the art to which embodiments of the present invention pertain without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and is within the scope of the claims.

What is claimed is:

1. One or more computer storage media having computer-executable instructions embodied thereon that, when executed, perform a method for detecting and alerting of anomalies within a cloud-computing infrastructure, the method comprising:

pulling information that describes a state of a plurality of computing devices, respectively, wherein the plurality of computing devices represent nodes within the cloud-computing infrastructure;

individually comparing the state information of the plurality of computing devices against one another;

based upon the comparison, grouping one or more computer devices of the plurality of computing devices into clusters of nodes that exhibit substantially similar state information;

identifying clusters of nodes that include low number of computer devices grouped therein with respect to a remainder of the clusters of nodes;

designating the computing devices within the identified clusters of nodes as anomalous machines; and initiating a communication that notifies an administrator of the cloud-computing infrastructure of the anomalous machines.

2. The media of claim 1, the method further comprising, ranking the anomalous machines against one another.

3. The media of claim 2, wherein ranking the anomalous machines against one another comprises:

targeting a healthy machine from one of the clusters of nodes that is separate from the identified cluster that includes the anomalous machines; and designating the targeted healthy machine as a reference machine.

4. The media of claim 3, wherein targeting the healthy machine comprises discovering the healthy machine having a least amount of derivation in state with respect to other healthy machines within the same cluster.

5. The media of claim 4, wherein ranking the anomalous machines against one another further comprises:

comparing the state information of the anomalous machines against state information of the reference machine; and based on the comparison, assigning scores to each of the anomalous machines, respectively, wherein the scores quantify a distance in state between the anomalous machines and the reference machine.

6. The media of claim 5, wherein ranking the anomalous machines against one another further comprises:

weighting the scores in accordance with a predefined weighting scheme; and ranking the anomalous machines using the weighted scores.

7. The media of claim 1, wherein the state information comprises firewall rules installed on the computing devices, respectively.

8. The media of claim 1, wherein the state information comprises indicia of software components installed on the computing devices, respectively.

9. The media of claim 8, wherein the software components represent instances of roles of a service application, and wherein the computing devices are capable of distributively hosting the role instances within the cloud-computing infrastructure.

10. The media of claim 9, wherein the role instances are designed for carrying out particular functional aspects of the service application.

11. A computerized method for discovering anomalies within nodes of a cloud-computing infrastructure based on a comparison technique, the method comprising:

identifying a subset of nodes within the cloud-computing infrastructure that host common program components;

accessing software characteristics of computing devices within the subset of nodes;

executing a clustering algorithm on the subset of nodes using the software characteristics, wherein executing the clustering algorithm comprises:

(a) quantifying software characteristics that are shared between a first computing device and a second computing device within the subset of nodes;

(b) when a number of shared software characteristics satisfy a predefined threshold, grouping the first and second computing devices into a common cluster; and (c) when a number of shared software characteristics fail to meet the predefined threshold, assigning the first computing device to a first cluster and the second computing devices to a second cluster;

comparing a number of computing devices grouped within the first cluster against a number of computing devices grouped within the second cluster to identify a cluster having a minimal number of computing devices assigned thereto;

storing a marker in association with the computing devices, respectively, grouped within the identified cluster that indicates there exist anomalies within the computing devices of the identified cluster.

12. The computerized method of claim 11, further comprising computing a difference between the software characteristics of the first computing device and the software characteristics of the second computing device.

13. The computerized method of claim 12, further comprising, upon computing a difference between the software characteristics of the first and second computing devices, generating a report that articulates components that are not shared by the first and second computing devices.

14. The computerized method of claim 12, wherein quantifying software characteristics that are shared between the first and second computing devices comprises executing a similarity function that uses as inputs a state of the first computing device and a state of the second computing device.

15. A self-learning system for performing a method that extracts information from nodes to identify anomalies prior to the anomalies affecting functionality of a service application running on the nodes, the computer system comprising a processing unit coupled to a computer storage medium, the computer storage medium having stored thereon a plurality of computer software components executable by the processing unit, the computer software components comprising:

a first agent residing on a first node within a set of nodes, wherein the first agent is configured to monitor a state of the first node;

a second agent residing on a second node within the set of nodes, wherein the second agent is configured to monitor a state of the second node; and an early-warning mechanism that receives information describing the state of the first node from the first agent and information describing the state of the second node from the second agent, wherein the early-warning mechanism is further configured for comparing the state information of the first node against the state information of the second node, for grouping the first and second nodes into a single cluster when the state information of the first and second nodes is comparable, for assigning the first and second nodes into separate clusters, respectively, when the state information of the first and second nodes is dissimilar, and for targeting one of the clusters as including a fewest number of nodes grouped therein, with respect to a remainder of the clusters, for designation as including anomalous machines.

16. The system of claim 15, wherein the set of nodes represent computing devices capable of distributively hosting tenants the service application within a cloud-computing infrastructure.

17. The system of claim 16, wherein the early-warning mechanism is further configured for initiating a communication that notifies an administrator of the cloud-computing infrastructure of the anomalous machines.

18. The system of claim 15, wherein the state information of the first and second nodes comprises firewall rules.

19. The system of claim 15, wherein the state information of the first and second nodes comprises indicia of software components installed on the first and second nodes, respectively.

20. The system of claim 19, wherein the software components represent one or more instances of roles of the service application.

* * * * *